(12) United States Patent
Chiaradia et al.

(10) Patent No.: US 12,169,100 B2
(45) Date of Patent: Dec. 17, 2024

(54) HEAT EXCHANGER DEVICE WITH ADIABATIC AIR COOLER

(71) Applicant: JAEGGI Hybridtechnologie AG, Basel (CH)

(72) Inventors: Nicolas Chiaradia, Basel (CH); Tobias Schaub, Basel (CH); Jorge Rosado, Basel (CH); Stephan Mestan, Basel (CH); Thomas Odrich, Basel (CH)

(73) Assignee: JAEGGI Hybridtechnologie AG, Basel (CH)

( * ) Notice: Subject to any disclaimer, the term of this patent is extended or adjusted under 35 U.S.C. 154(b) by 734 days.

(21) Appl. No.: 17/283,423

(22) PCT Filed: Oct. 9, 2019

(86) PCT No.: PCT/EP2019/077375
§ 371 (c)(1),
(2) Date: Sep. 2, 2021

(87) PCT Pub. No.: WO2020/074587
PCT Pub. Date: Apr. 16, 2020

(65) Prior Publication Data
US 2022/0003502 A1    Jan. 6, 2022

(30) Foreign Application Priority Data

Oct. 12, 2018  (DE) .......................... 102018125278.1

(51) Int. Cl.
*F28C 1/14*    (2006.01)
*F28D 1/02*    (2006.01)
(Continued)

(52) U.S. Cl.
CPC ................ *F28C 1/14* (2013.01); *F28D 1/024* (2013.01); *F28D 1/0426* (2013.01); *F28F 25/04* (2013.01);
(Continued)

(58) Field of Classification Search
CPC .......... F28C 1/14; F28D 1/024; F28D 1/0426; F28F 25/04; F28F 25/06; F28F 25/087; F28F 2250/08
(Continued)

(56) References Cited

U.S. PATENT DOCUMENTS

| | | | | |
|---|---|---|---|---|
| 4,389,352 A | * | 6/1983 | Bohanon, Sr. ............ | F24F 6/04 261/106 |
| 8,966,924 B2 | * | 3/2015 | Pichai ...................... | F28C 1/14 62/310 |

(Continued)

FOREIGN PATENT DOCUMENTS

| | | |
|---|---|---|
| CA | 3076351 A1 | 3/2019 |
| CH | 692759 A5 | 10/2002 |

(Continued)

OTHER PUBLICATIONS

PCT International Search Report and Written Opinion, Application No. PCT/EP2019/077375, dated Jan. 3, 2020, 14 pages.

(Continued)

*Primary Examiner* — Claire E Rojohn, III
(74) *Attorney, Agent, or Firm* — Mahamedi IP Law LLP

(57) ABSTRACT

A heat exchanger device with at least one heat exchanger which is flowed through by a fluid, at least one fan and at least one adiabatic air cooler for cooling air which is drawn in from the surroundings by the fan, wherein the air that has been drawn in is conducted firstly through the air cooler and subsequently through the heat exchanger and the adiabatic air cooler has at least one humidification means, which is arranged in the air cooler and which is composed of a moisture-absorbing material and a liquid feed, which feeds a liquid to the humidification means in order to keep the humidification means moist. In order that the most uniform possible wetting of the humidification means and higher heat exchange performance can be made possible without an impairment of the stability and the handleability of the humidification means and without oversaturation of the humidification means in the upper region with the liquid, provision is made whereby the humidification means comprises at least two mats arranged one above the other and whereby the liquid feed has a distributor device which is arranged above each mat and which serves for uniformly distributing the liquid onto the mats, wherein each distributor device is connected to a feed line via which the distributor devices can be charged with the liquid.

19 Claims, 7 Drawing Sheets

Figure 1:
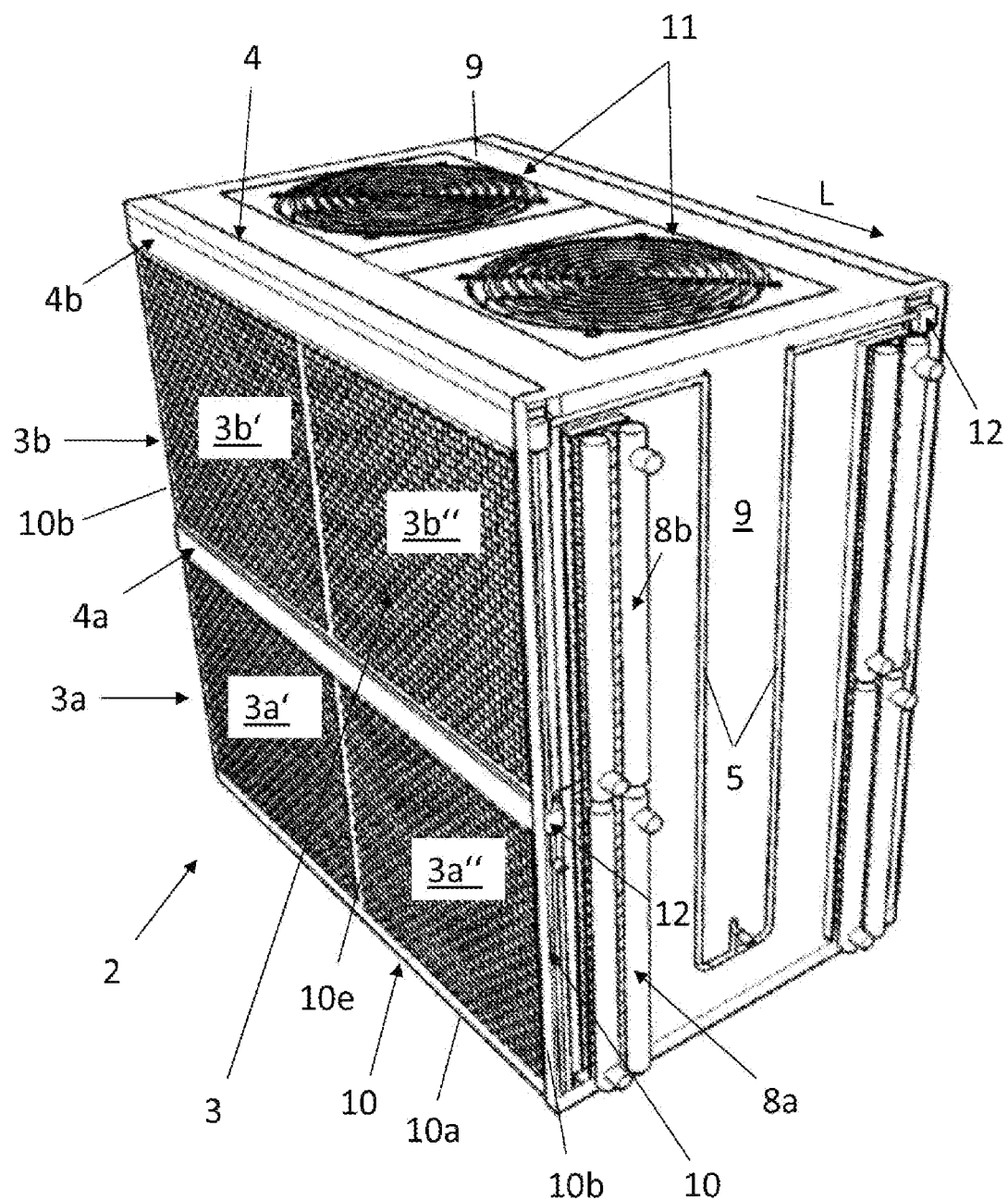

(51) Int. Cl.
  *F28D 1/04*   (2006.01)
  *F28F 25/04*  (2006.01)
  *F28F 25/06*  (2006.01)
  *F28F 25/08*  (2006.01)

(52) U.S. Cl.
  CPC ............ *F28F 25/06* (2013.01); *F28F 25/087* (2013.01); *F28F 2250/08* (2013.01)

(58) Field of Classification Search
  USPC .......................................................... 165/110
  See application file for complete search history.

(56) References Cited

U.S. PATENT DOCUMENTS

| | | | |
|---|---|---|---|
| 9,091,450 B2 * | 7/2015 | Ritchie | F28D 5/00 |
| 9,091,485 B2 * | 7/2015 | Bugler, III | F28F 27/003 |
| 9,453,687 B2 * | 9/2016 | Kwon | F28B 1/06 |
| 9,612,025 B2 * | 4/2017 | Wong | F25B 1/005 |
| 10,788,268 B2 * | 9/2020 | Byrne | F28F 13/003 |
| 2005/0012230 A1 | 1/2005 | Kammerzell et al. | |
| 2011/0100593 A1 * | 5/2011 | Benz | F28D 1/0477 165/59 |
| 2018/0224174 A1 | 8/2018 | Hollander et al. | |
| 2019/0137183 A1 * | 5/2019 | Byrne | F28B 1/06 |

FOREIGN PATENT DOCUMENTS

| | | |
|---|---|---|
| DE | 2132265 A1 | 1/1972 |
| DE | 202017102138 U1 | 7/2018 |
| EP | 1698847 A1 | 9/2006 |
| EP | 3306247 A1 | 4/2018 |
| KR | 101436256 B1 | 8/2014 |
| WO | 2010037164 A1 | 4/2010 |
| WO | 2013049685 A1 | 4/2013 |
| WO | 2019060463 A2 | 3/2019 |

OTHER PUBLICATIONS

China National Intellectual Property Administration, Office Action, CN Application No. 201980063656.9, mailed Mar. 17, 2022, 9 pages.
Canadian Intellectual Property Office, Office Action, CA Application No. 3,115,873, mailed Jun. 21, 2024, 6 pages.
IP Australia, Office Action, AU Application No. 2019358227, mailed Jul. 11, 2024, 4 pages.

* cited by examiner

HEAT EXCHANGER DEVICE WITH ADIABATIC AIR COOLER

A generic heat exchanger device, which can be used for example in refrigeration systems as a return cooler to cool a cooling fluid or in condensers to liquefy a refrigerant, is known from DE 20 2017 102 138 U1. This heat exchanger device comprises a heat exchanger, which can be charged with the cooling fluid or the refrigerant, via which air drawn in from the surroundings is conducted in order to cool the cooling fluid circulating in the heat exchanger or to liquefy a refrigerant circulating therein. To this end, the heat exchanger comprises a pipeline system, for example in the form of bent pipelines, which are flowed through by the cooling fluid or the refrigerant, with fins composed of a thermally-conductive material being arranged on the pipelines to improve the heat exchange by increasing the effective heat exchange area. To draw in surrounding air, at least one fan is provided in the heat exchanger device which draws in air from the surroundings and conducts it through the heat exchanger.

In order to ensure adequate cooling of the cooling fluid or cooling of the refrigerant circulating in the heat exchanger even at high external temperatures to below its condensation temperature, the return coolers and condensers known from the prior art have an adiabatic air cooler arranged upstream of the heat exchanger in which the air that is drawn in is firstly pre-cooled adiabatically and subsequently conducted via the heat exchanger to exchange heat with the fluid circulating therein. In the adiabatic air cooler, the air that is drawn in is conducted through a means moistened with a liquid, in particular water, which is formed for example of water-absorbing mats and adiabatically cooled as a result. In the heat exchanger device of DE 20 2017 102 138 A1, an adiabatic air cooler is provided for this purpose which has interchangeable mats composed of a moisture-absorbing material and is moistened by means of a liquid feed with a liquid, in particular water. The air that is drawn in from the surroundings by the fan is firstly guided through the adiabatic air cooler and in doing so is pre-cooled by evaporative cooling and is subsequently conducted via the heat exchanger to exchange heat with the fluid carried therein.

Two heat exchangers are often arranged in the known heat exchanger devices with adiabatic air coolers, which are arranged for example standing vertically at a distance to one another, opposite one another or in a V shape. In this case, one adiabatic air cooler is assigned to each heat exchanger and is arranged upstream of the assigned heat exchanger, with the mats of the adiabatic air cooler being able to run parallel or even at an angle to the inflow surface of the respectively assigned heat exchanger.

If, according to this constructive principle of the known heat exchanger devices, a heat exchanger device with a higher performance should be provided, the inflow surface of the heat exchangers arranged opposite one another and accordingly the surfaces of the mats of the adiabatic air cooler can be increased. In the case of an enlargement of the extension of the mats of the adiabatic air cooler in the vertical direction, problems arise, however, in relation to the stability and manageability of the mats, because mats that are too high are unstable when completely moistened and can no longer be handled by one operator when changing the mats. These problems in relation to instability and difficult manageability when changing the mats arise for example from a mat height of 2 m or more. Moreover, in the case of mats that are too high, a strong oversaturation of the mat with the humidification liquid may result in the upper mat region since a larger mat has to be moistened with a greater amount of liquid when it has to be ensured that the mat is fully moistened over its entire height. An oversaturation of the mat in its upper region with the humidification liquid may lead to the humidification liquid in the form of droplets being drawn out of the mat by the air drawn in by the fan. As a result, the efficiency of the moistening of the mats reduces and problems of corrosion in the heat exchanger device may occur because the liquid droplets escaping from the mats may adhere to corrosion-prone components of the heat exchanger device.

Proceeding from this, it is desirable to further develop a heat exchanger device such that the most uniform possible wetting of the mats and a higher heat exchange performance is made possible without impairment of the stability and the manageability of the mats and without oversaturating the mats in their upper region with the humidification liquid.

This, among other improvements, can be achieved by a heat exchanger device with features described herein.

The heat exchanger device according to embodiments comprises at least one heat exchanger flowed through by a fluid, at least one fan and at least one adiabatic air cooler for cooling air, which is drawn in from the surroundings by the fan, with the air that is drawn in firstly being conducted through the air cooler and subsequently through the heat exchanger and the adiabatic air cooler has at least one humidification means arranged in the air cooler and which is composed of moisture-absorbing material and a liquid feed, which feeds a liquid to the humidification means in order to keep the humidification means moist, with the humidification means comprising at least two mats arranged one above the other and the liquid device having a distributor device arranged above each mat which is connected to a feed line via which the distributor device is charged with the liquid and which distributes the liquid uniformly on the mat assigned thereto.

In the heat exchanger device according to embodiments, one adiabatic air cooler is accordingly assigned to each heat exchanger, said air cooler having a humidification means which is composed of at least two mats which are arranged one above the other, with a distributor device connected to the feed line being assigned to each mat for uniform distribution of the liquid on the respective mat and being arranged above the assigned mat for this purpose. Since each mat is assigned its own distributor device, a uniform wetting of each mat with the liquid can be achieved both over its entire thickness and over its entire height. Furthermore, the humidification means remains more easily manageable, for example when changing the mats, by dividing it into at least two mats arranged one above the other. Therefore, heat exchanger devices with higher performance can be implemented without having to accept any losses in relation to a uniform wetting and easy manageability of the humidification means.

The humidification means of the heat exchanger device according to embodiments can in this case be arranged standing vertically such that the middle level of the humidification means (or the inflow surface of the mats through which flows the air that is drawn in) runs along the vertical direction. A vertical arrangement of the humidification means is in particular expedient in the case of a vertical orientation of the heat exchangers, which are formed flat. In the case of a vertical arrangement of the humidification means, the mats, of which the humidification means is composed, are arranged vertically one above the other and aligned with one another and extend along a mat level (middle level of the mat). If the heat exchangers are, in contrast thereto, oriented inclined to the vertical, as is for example the case with heat exchanger devices having two heat exchangers arranged in a V shape to one another, the humidification means assigned to the heat exchangers are expediently inclined to the vertical, can be at the same angle, and therefore can run parallel to the inflow surface of the heat exchangers which are arranged obliquely. In this case, the (middle) level of the mats of the humidification means also runs obliquely to the vertical direction. However, it is also possible, e.g. to arrange a lower mat running obliquely to the vertical and an upper mat standing vertically thereabove.

In order to be able to distribute the liquid, which is fed to the distributor devices via the feed line, uniformly on the mat assigned to each distributor device, each distributor device has a distributor body which distributes the liquid uniformly on an upper side of the assigned mat. The distributor devices can for example be formed as liquid-permeable pipes or hose lines carrying the liquid. The distributor devices can have in particular the shape of a perl hose made of a porous material or a perforated hose. The distributor devices can also have perforated pipelines or pipelines with a plurality of openings or nozzles via which the liquid is sprayed or trickled on the upper side of the assigned mat. Furthermore, the distributor devices can also have other distributor bodies, such as e.g. comprising a distributor plate with openings uniformly distributed over the distributor plate, through which the liquid can flow onto the upper side of the assigned mat.

To simplify changing of the mats, they are expediently arranged in an air cooler housing so as to be changeable. The air cooler housing has, in an embodiment, a base part formed as a collection tray or channel, at least two side parts standing perpendicular to the base part and at least one first (middle) transverse strut and a second (upper) transverse strut. The base part and the transverse struts extend in this case in the longitudinal direction of the heat exchanger device. In this case, a first mat is arranged between the base part and the first (middle) transverse strut and a second mat is arranged between the first (middle) transverse strut and the second (upper) transverse strut. In this case, a first distributor device is arranged above the first mat and a second distributor device is arranged above the second mat. Therefore, a distributor device is assigned to each mat, with which the liquid can be delivered onto the upper side of the respectively assigned mat. The first distributor device assigned to the first mat is expedient in this case and is housed in the first (middle) transverse strut to achieve a simple construction, and the second distributor device, which is assigned to the second mat, is housed in the second (upper) transverse strut. The transverse struts in this case expediently form a housing for the distributor devices and are, for this purpose, configured for example as a square housing with a base, a cover and two side walls. The base of each transverse strut in this case can have passages through which the liquid can pass in order to reach the mat arranged respectively therebelow. The first (middle) transverse strut expediently also has passages in the cover such that the excess liquid flowing from the (second) mat arranged thereabove can enter through the passages onto the first (mat) located therebelow. This prevents excess liquid, which has flowed through an upper mat from above downwards, from accumulating in the region of the transverse struts.

The transverse struts, between which the mats extend, are advantageously provided with a receiving region in which an underside and/or an upper side of a mat can be received. The receiving region of a transverse strut can in this case for example be formed by a profile that is U-shaped in the cross-section. Simple and cost-effective production of the transverse struts is achieved for example when forming the transverse struts as U-shaped plate parts. The first (middle) transverse strut can have a double-U profile in which both the upper side of the first (lower) mat and the underside of the second (upper) mat can be received.

The distributor devices expediently run in the level of the respectively assigned mat of the humidification means, in particular in the middle level of the respective mat. However, it is also possible that the distributor devices are arranged offset to the middle level of the mat. A uniform moistening of the mats results, however, with an arrangement of the distributor device in the middle level of the assigned mat. The distributor devices can in this case also comprise a plurality of lines or hoses which run at a distance and parallel to one another and parallel to the middle level of the mat. An arrangement of a plurality of lines or hoses above the mat ensures a uniform moistening of the mat over its entire thickness.

The distributor devices are expediently connected to the feed line via a distributor to supply the liquid. When using a plurality of lines or hoses, a multiple distributor is used which distributes the liquid uniformly to the individual lines or hoses. The feed line is expediently coupled to a pump which delivers a liquid, for example water, under pressure to the distributor devices. The individual distributor devices can advantageously be actuated selectively independently of one another. This means that only individual mats of the humidifications means are moistened with the liquid. A selective moistening of only individual mats of the humidification means enables the operation of the heat exchanger device and of the adiabatic air cooler in a partial load, for example in the transition period in fall and in spring. By operating the adiabatic air cooler in a partial load, the formation of sediments on the base of the mats can be prevented with a selective actuation of the distributor devices with a moistening of only individual mats. Moreover, during operation of the adiabatic air coolers in a partial load, liquid for the moistening of the humidification means can be saved when only individual mats of the humidification means are kept moist.

The individual mats can be composed of a plurality of mat sections, with the mat sections each being arranged in the middle level of the mat running either in the longitudinal direction of the air cooler edge-to-edge next to one another and/or perpendicular to the longitudinal direction one above the other. In the case of a vertical orientation of the humidification means or the mats, the mats arranged vertically one above the other can accordingly be composed both of mat sections arranged next to one another in the longitudinal direction of the air cooler and also one above the other in the vertical direction. The mat sections, which thereby form a mat, are expediently arranged aligned with one another, either edge-to-edge next to one another or one above the other. The composition of the mats of a plurality of mat sections simplifies handling of the mats, for example when changing a worn mat for a new mat or when removing the mats for winter operation during which the adiabatic air cooler is not required.

By assigning a distributor device to each mat according to embodiments, it can be ensured that each mat is adequately supplied with liquid in order to ensure a uniform wetting of the mats with the liquid. Therefore, it is not necessary to excessively oversaturate the upper region of the mats or the mats located above in the vertical direction with the liquid. This can in turn prevent the air current generated by the fan and directed inwards to the heat exchanger device from pulling liquid droplets of the excess liquid from the upper region of the mats and transporting it into the interior of the heat exchanger device where the liquid droplets could cause problems in relation to corrosion.

The heat exchangers arranged in the heat exchanger device according to embodiments can be divided through the composition of the humidification means of at least two mats arranged one above the other into a number of heat exchanger sections arranged vertically one above the other and corresponding to the number of mats, with each heat exchanger section having a pipeline system isolated from the other heat exchanger sections, through which the fluid flows, which is in heat exchange with the air conducted through the heat exchanger. In the case of this example embodiment of the heat exchanger device, a mat is assigned to each heat exchanger section in such manner that the air drawn in from the surroundings by the fan firstly flows through the respective mat and subsequently through the heat exchanger section assigned thereto. Through this assignment of a heat exchanger section and an associated mat, the entire heat exchanger device can be operated in a partial load by for example only the lower heat exchanger section being operated and the lower mat assigned thereto being moistened with liquid and the upper heat exchanger section and the upper mat assigned thereto not being operated. As a result, the efficiency of the heat exchanger device can be improved in the transition period in fall and spring.

Figure 2:
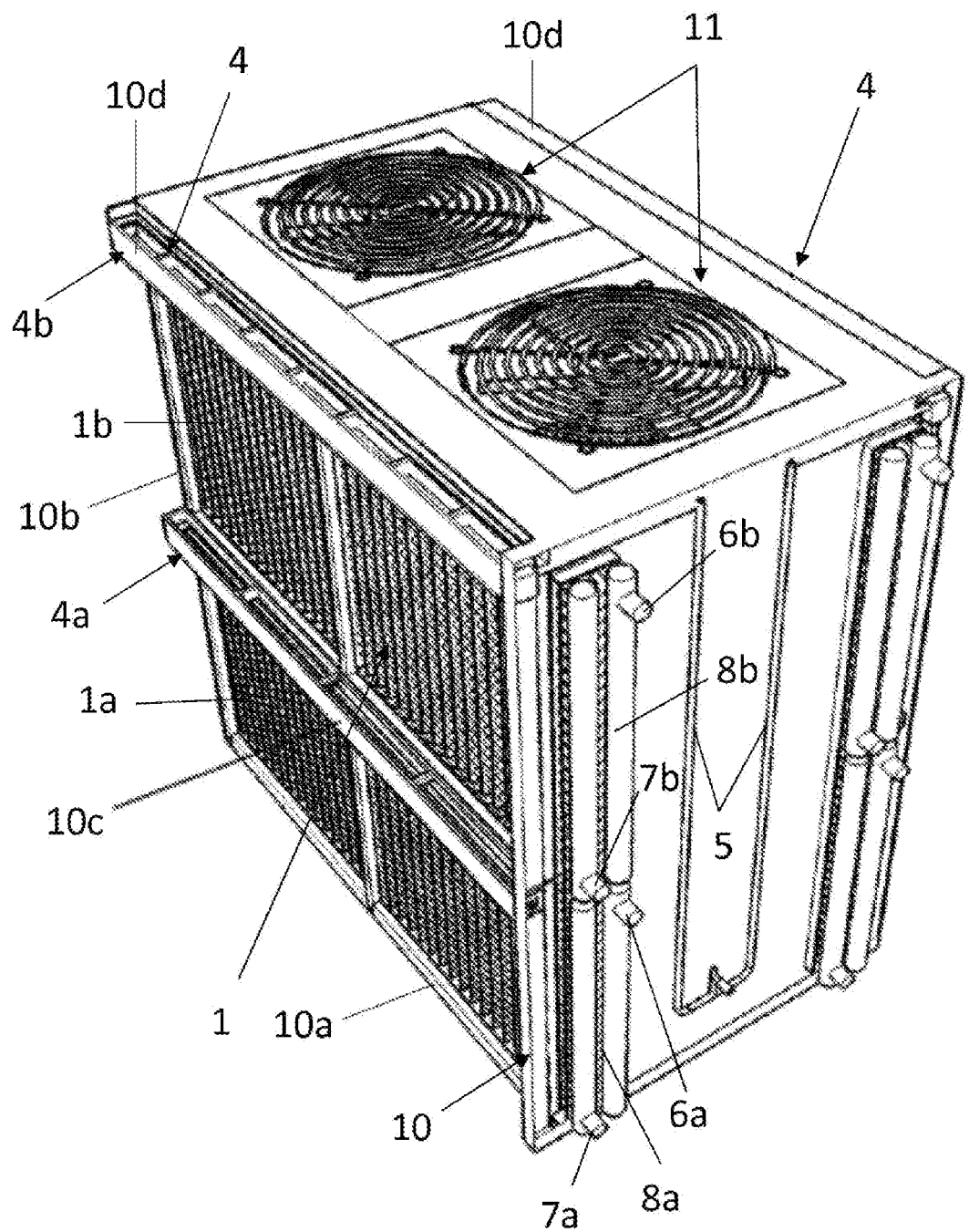
Figure 3A:
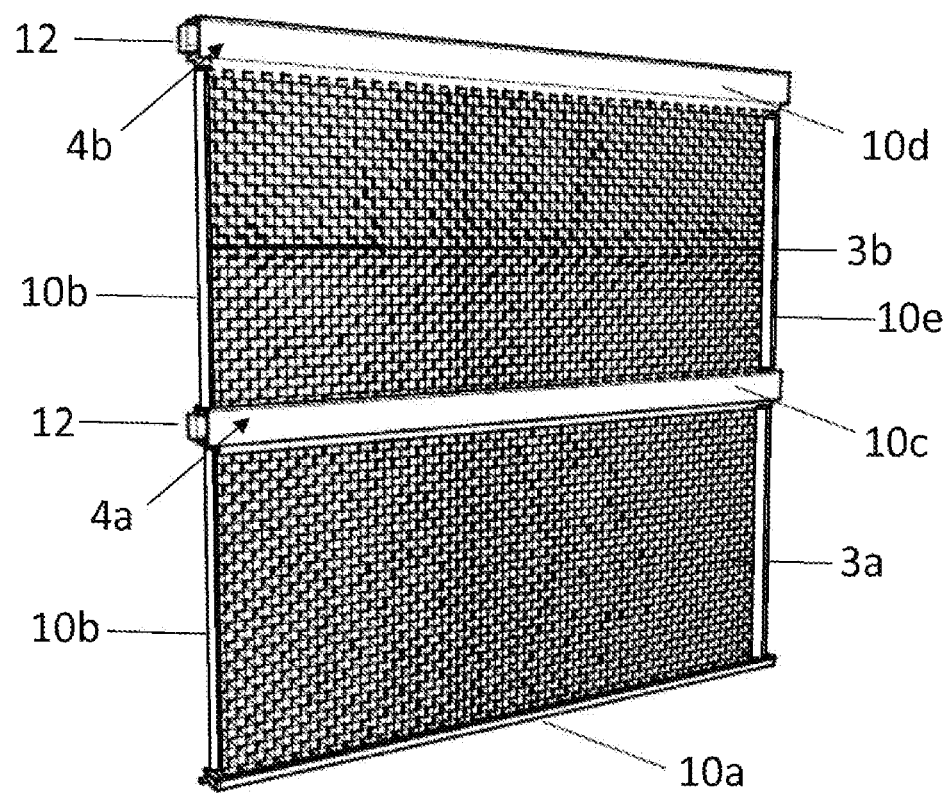
Figure 3B:
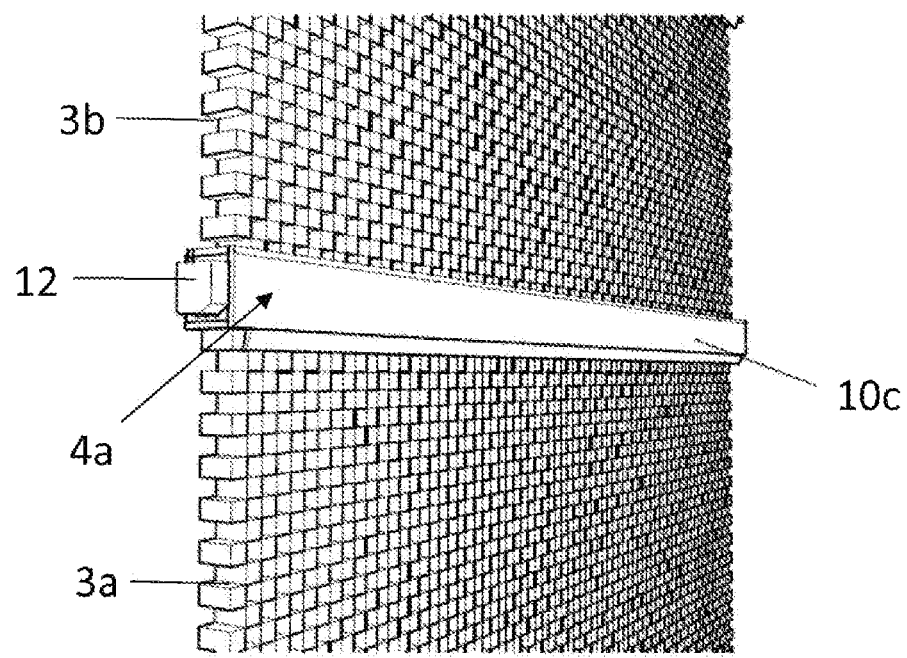
Figure 4A:
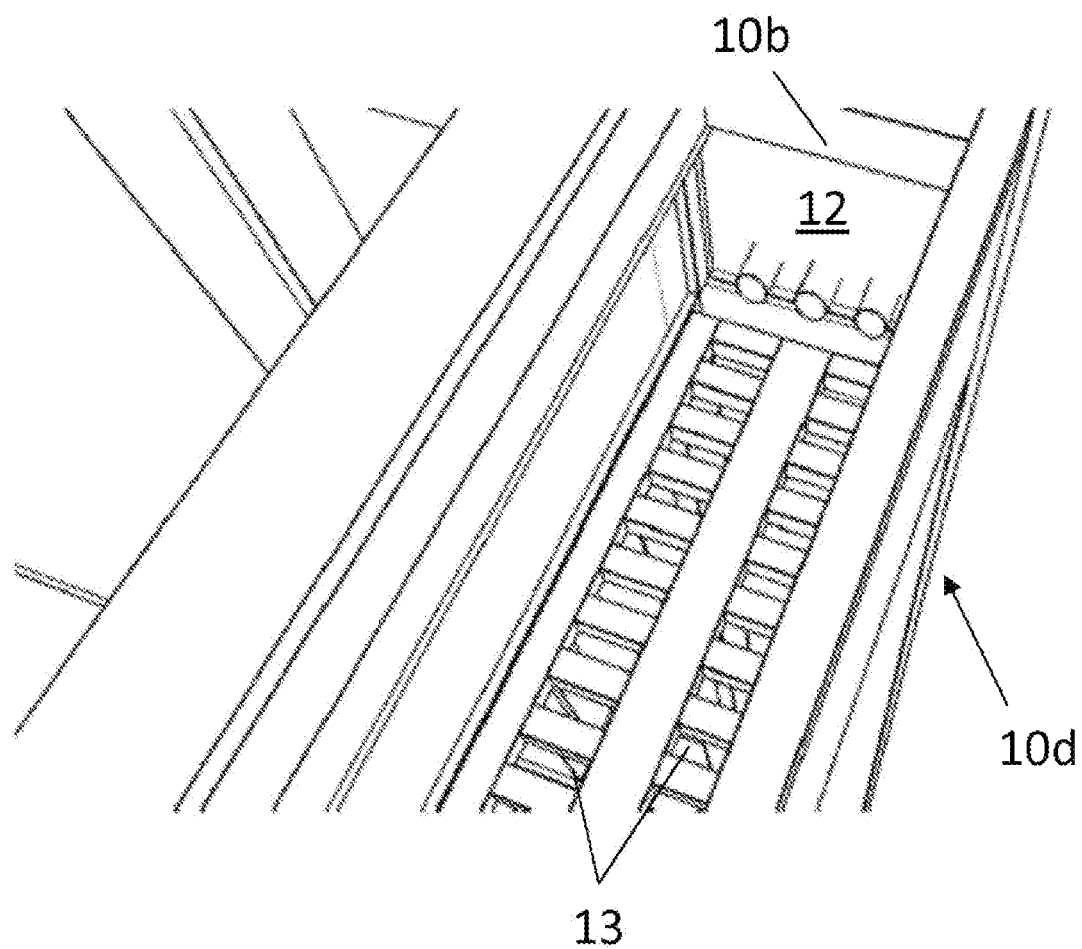
Figure 4B:
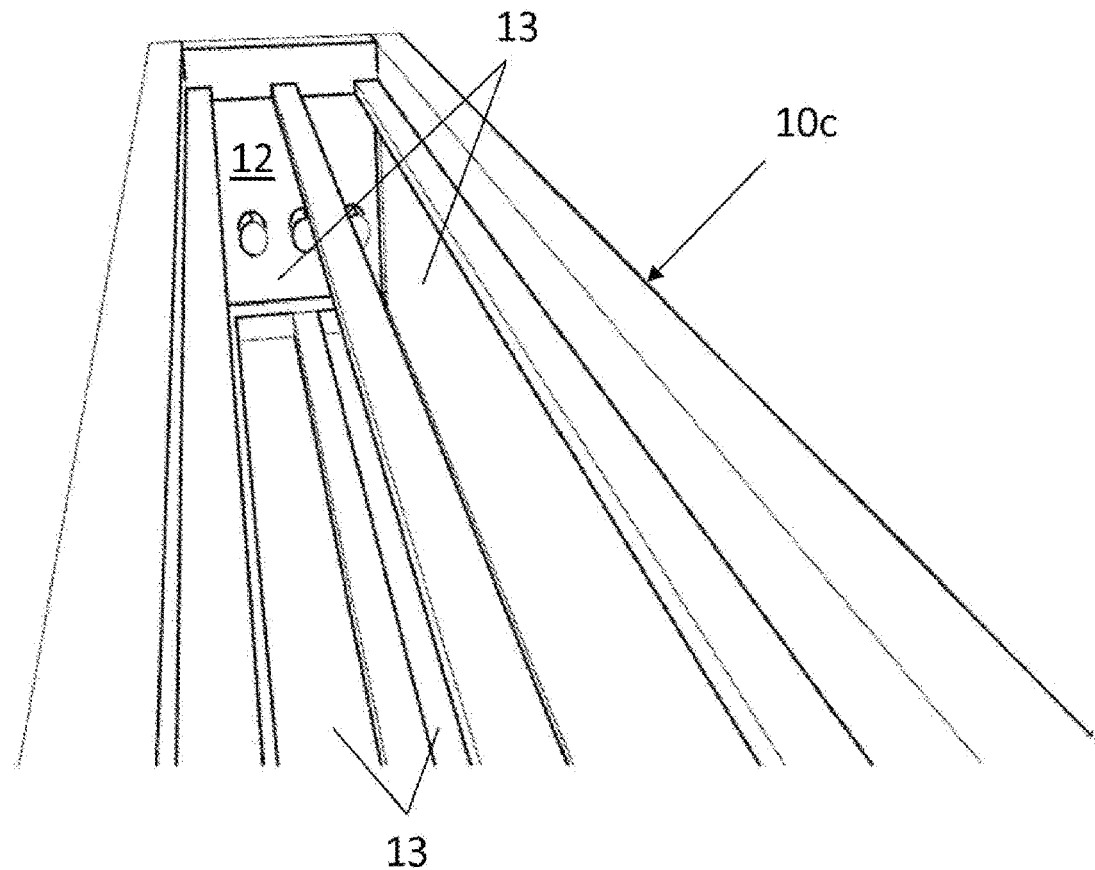
Figure 4C:
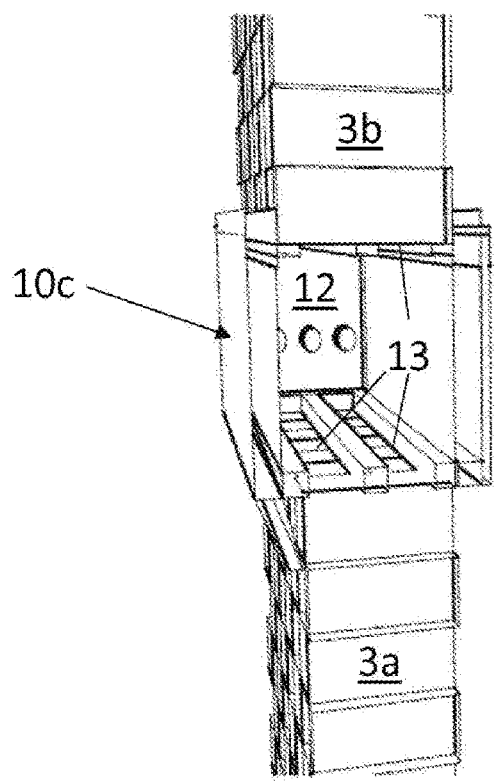
Figure 5:
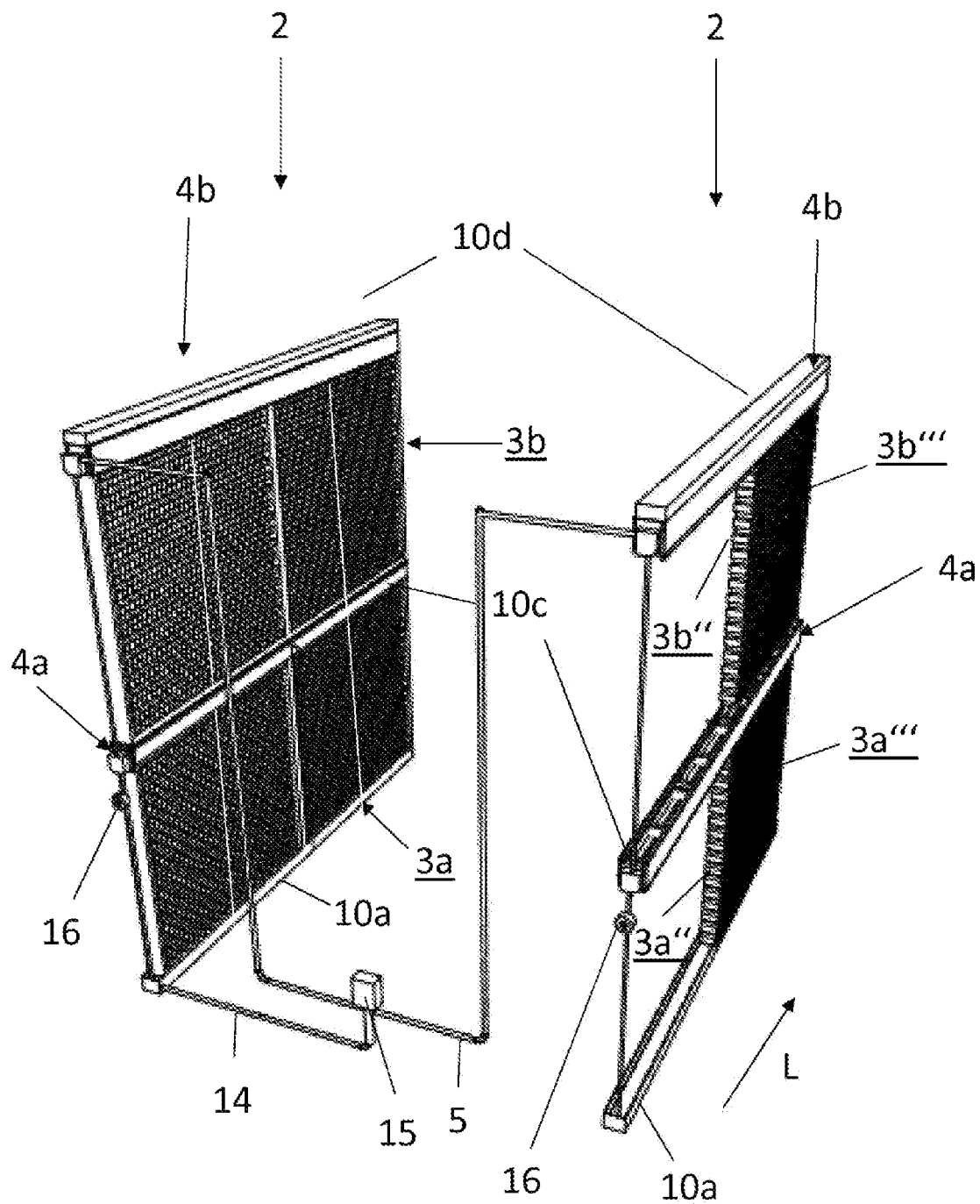
Figure 6:
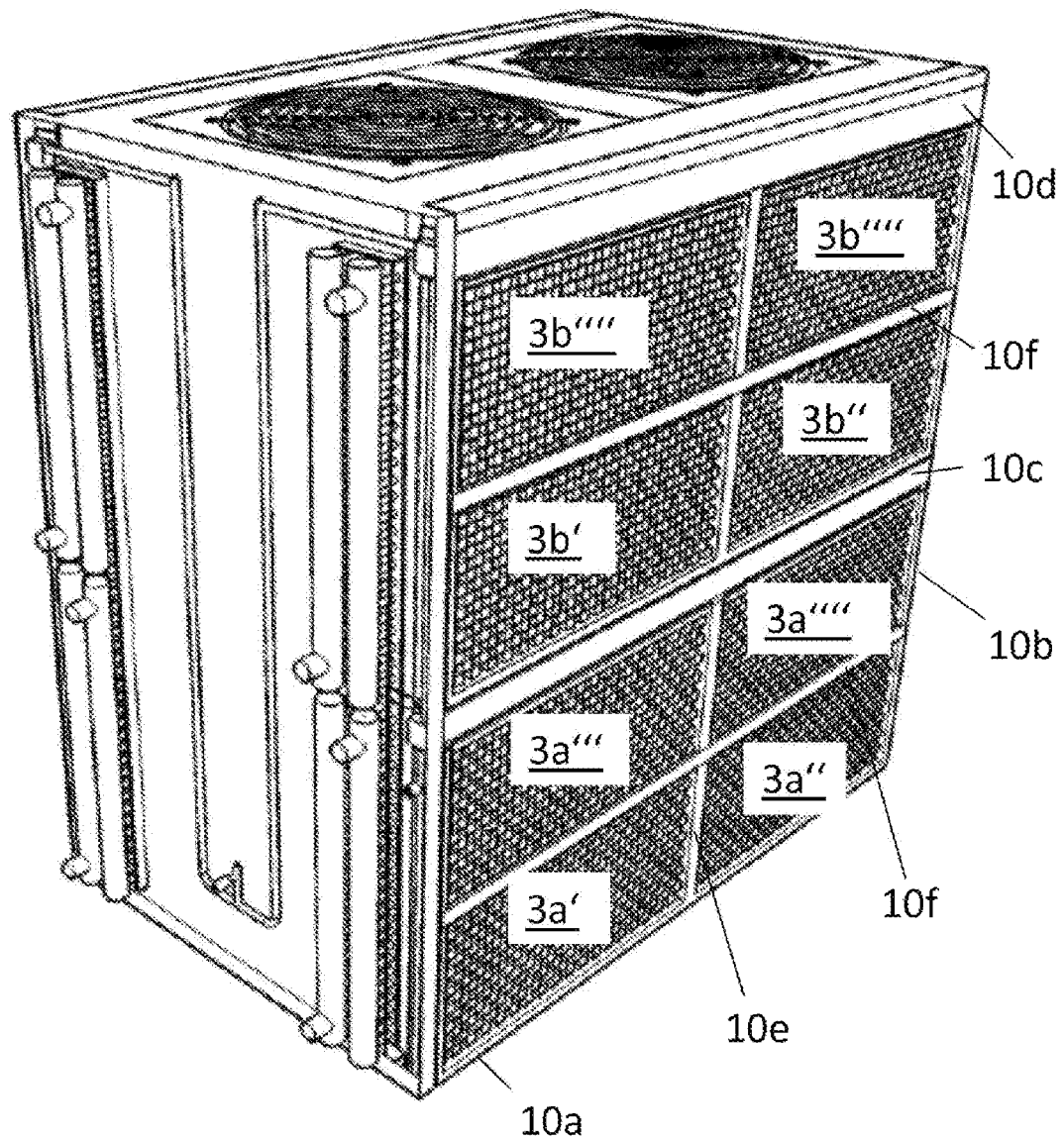

These and other advantages and features will emerge from the exemplary embodiments described in detail below with reference to the accompanying drawings. The drawings show:

FIG. 1: Perspective representation of a first embodiment of a heat exchanger device according to examples described herein;

FIG. 2: Representation of the embodiment of a heat exchanger device in accordance with FIG. 1 with removed humidification means, whereby the heat exchangers arranged in the heat exchanger device are visible;

FIG. 3a: Detail representation of a section of the adiabatic air cooler of the heat exchanger device from FIG. 1;

FIG. 3b: Detail representation of the adiabatic air cooler of FIG. 3a in the region of a distributor device to distribute liquid onto the mat arranged thereunder;

FIG. 4a: Detail representation of an upper distributor device of the adiabatic air cooler of FIG. 3a, with the cover of an upper transverse strut, in which this distributor device is arranged, being removed for clearer representation;

FIG. 4b: Detail representation of a lower distributor device of the adiabatic air cooler of FIG. 3a;

FIG. 4c: Sectional view of the lower distributor device of FIG. 4b, with the lines of this distributor device not being shown for clearer representation;

FIG. 5: Schematic representation of the liquid feed for the humidification means of the heat exchanger device of FIG. 1;

FIG. 6: Perspective representation of a second embodiment of a heat exchanger device according to examples described herein.

A heat exchanger device is shown in a perspective view in FIG. 1. The heat exchanger device comprises a box-shaped heat exchanger housing 9, which is constructed symmetrically to its middle longitudinal level. Two heat exchangers 1 are each arranged opposite one another in a side wall in the heat exchanger housing 9. The two heat exchangers 1 can for example be fin-tube heat exchangers (finned pipe heat exchangers) or tube bundle heat exchangers. Each heat exchanger 1 contains a pipeline system with a plurality of pipelines, which extend in the longitudinal direction L of the heat exchanger housing 9. The two heat exchangers 1, that are formed flat, are in this case arranged opposite one another in the heat exchanger housing 9 and standing vertically. However, it is also possible that the heat exchangers 1 are arranged standing inclined obliquely to the vertical and, when viewed from the side, in a V shape in relation to one another.

Each heat exchanger 1 is composed of two heat exchanger sections 1a, 1b arranged vertically one above the other, with the heat exchanger sections 1a, 1b having pipeline systems separated from one another, through which a fluid formed as the cooling means or refrigerant is conducted. Each heat exchanger section 1a, 1b is for this purpose connected to a distributor 8a, 8b, with each distributor 8a, 8b having an inlet 6a or 6b and an outlet 7a, 7b. The fluid is conducted into the heat exchanger sections 1a, 1b via the inlet 6a, 6b and distributed by the respective distributor 5a, 5b into the pipelines of the heat exchanger sections 1a, 1b. The fluid circulates in the pipelines of the heat exchanger sections 1a, 1b and flows out on both sides through the respective outlet 7a, 7b of the distributor 5a or 5b. The inlets 6a, 6b and the outlets 7a, 7b are connected to feed and discharge lines not represented here, via which the fluid is fed and discharged.

An adiabatic air cooler 2 is assigned to each heat exchanger 1 of the heat exchanger device of FIG. 1, wherein the air coolers 2 are arranged in lateral air inlet openings of the heat exchanger housing 9. Each air cooler 2 contains a humidification means 3 which extends along one plane and is composed of a moisture-absorbing material and a liquid feed 4, over which the liquid, in particular water, is fed to the humidification means 3 in order to keep the humidification means 3 moist. The mats 3a, 3b are each formed of a moisture-absorbing material, for example of corrugated cardboard or paper webs or of a block of cellulose or an open-pore foam material.

The level of the humidification means 3, in which the mats 3a, 3a are extending, is understood here as the midplane of the mats, which are formed flat or plate-shaped. The level, in which the humidification means 3 extends, runs, in the embodiment shown, vertically and is parallel to the inflow surface of the assigned heat exchanger 1.

The humidification means 3 is composed of two mats 3a, 3b running in the level and arranged aligned with one another, vertically one above the other, with a lower mat 3a being assigned to the lower heat exchanger section 1a and an upper mat 3b being assigned to the upper heat exchanger section 1b in such manner that the lower mat 3a is arranged opposite the lower heat exchanger section 1a and the upper mat 3b is arranged opposite the upper heat exchanger section 1b.

The mats 3a, 3b shown in FIG. 1 are removed in FIG. 2 such that the heat exchanger sections 1a, 1b located therebelow are visible.

The liquid feed 4 has a distributor device 4a, 4b arranged above each mat 3a, 3b to uniformly distribute the liquid on the mats 3a, 3b. Each distributor device 4a, 4b is connected to a feed line 5, via which the respective distributor device 4a, 4b is supplied with the liquid, in particular with water.

Two fans 11 are used in the openings of the heat exchanger housing 9 on the upper side of the heat exchanger housing 9, with each fan 11 being placed between the opposing heat exchangers 1. The fans 11 draw in surrounding air and conduct it firstly through the air coolers 2 arranged laterally on the heat exchanger housing 9 and from there conduct it through the lateral air inlet openings in the heat exchanger housing 9 between the pipelines of the heat exchangers 1. The air that is drawn in is thereby firstly cooled adiabatically in the adiabatic air coolers 2 and the cooled air absorbs heat from the fluid circulating therein when passing through the heat exchangers 1, whereby the fluid is cooled or liquefied. The air heated by the heat exchange with the fluid in the heat exchangers 1 is blown out by the fans 11 on the upper side from the heat exchanger housing 9.

The two air coolers 2 arranged laterally on the heat exchanger housing 9 are each constructed identically, with each air cooler having its own liquid feed 4, which is connected in each case via a feed line 5 to a liquid reservoir not represented here. The liquid is pumped into the line 5 via a pump device also not represented here. A pump device can possibly be dispensed with when the liquid is already provided under pressure from the liquid reservoir, as is the case e.g. when using water from the domestic drinking water line.

he liquid feed 4 comprises a separate distributor device 4a, 4b for each of the mats 3a, 3b. Each mat 3a, 3b is thus assigned its own distributor device 4a, 4b, with each distributor device 4a, 4b comprising a distributor body, which distributes the liquid uniformly onto an upper side of the mat 3a, 3b assigned to the respective distributor device 4a, 4b. The distributor devices 4a, 4b can for example be formed as liquid-permeable pipe or hose lines carrying the liquid, in particular in the form of a perl hose made of a porous material or in the form of a pipeline with a number of openings or nozzles, through which the liquid can reach the upper side of the mat 3a, 3b located therebelow. The liquid fed by the liquid feed 4 in this case escapes through the openings or nozzles of the distributor devices 4a, 4b to the upper side of the respectively assigned mat 3a, 3b and flows forced by gravity downwards into the moisture-absorbing material of the mats 3a, 3b, whereby said mats are moistened. Thereby, further distributor bodies, such as e.g. a distributor plate with openings or passages therein, can be arranged between the pipe or hose lines of a distributor device 4a, 4b and the upper side of the assigned mat 3a, 3b.

In order to supply the mats 3a, 3b uniformly over their entire thickness with liquid, each distributor device 4a, 4b can contain a plurality of lines, which extend horizontally in the longitudinal direction L and are arranged parallel and in the transverse direction (i.e. perpendicular to the longitudinal direction L) over the thickness of the mats 3a, 3b at a distance to one another.

Each air cooler 2 comprises an air cooler housing 10 laterally fastened on the heat exchanger housing 9 with a pan-shaped base part 10a which extends in the horizontal direction and two side parts 10b standing perpendicularly opposite the base part 10a. The mats 3a, 3b, which form the humidification means 3, are arranged so as to be interchangeable in the air cooler housing 10. In the exemplary embodiment shown in FIG. 1, the humidification means 3 is composed of the lower mat 3a and the upper mat 3b. In this case, each mat 3a, 3b can be removed separately from the air cooler housing 10.

As is apparent from a comparison of FIGS. 1 and 2, each mat 3a, 3b used in the air cooler housing 10 runs parallel and in a horizontal direction aligned perpendicularly to the longitudinal direction L in relation to the respectively assigned flat heat exchanger section 1a, 1b of the heat exchanger 1. In the case of mats 3a, 3b inserted into the air cooler housing 10, the mat level (longitudinal center plane of the mats 3a and 3b) runs parallel to the vertically oriented heat exchanger 1.

Excess liquid, which is flowed through the mats 3a, 3b, without being drawn from the mat material, flows into the pan-shaped base part 10a of the air cooler housing 10 and is collected there. Outlet nozzles are arranged on the pan-shaped base part 10a, via which the liquid collected in the pan-shaped base can be discharged.

It can be discerned from FIG. 1 that each mat 3a, 3b is composed of two mat sections 3a', 3a" or 3b', 3b" arranged next to one another in the longitudinal direction L. The mat sections 3a', 3a" or 3b', 3b" located next to one another therein are arranged edge-to-edge in relation to one another on their vertically standing side edges. In this case, a vertical strut 10e of the air cooler housing can also be provided between the butt joints of mat sections 3a', 3a" or 3b', 3b" located next to one another, as shown in FIG. 1. However, it is also possible that the mat sections 3a', 3a" or 3b', 3b" rest edge-to-edge on one another on their side edges without intermediate space.

The construction of the air cooler housing 10 can be inferred in detail from the FIGS. 1 and 2 and FIGS. 3a and 3b. As is discernible from FIGS. 1 and 2, the air cooler housing 10 comprises, in addition to the base part 10a and the side walls 10b, a first middle transverse strut 10c and a second upper transverse strut 10d, with the transverse struts 10c, 10d extending in the longitudinal direction L and running parallel to the base part 10a. Each transverse strut 10c, 10d forms a mount for the mats 3a or 3b. For this purpose, the transverse struts 10c, 10d have, on their upper or lower side, profiles, which are U-shaped in the cross-section and which can be formed for example of a metal sheet. A lower side or an upper side of a mat 3a, 3b can be inserted into the U-shaped profiles of the transverse struts 10c, 10d. The middle transverse strut 10d contains one U-shaped profile pointing upwards and one pointing downwards in order to be able to receive the upper side of the lower mat 3a and also the lower side of the upper mat 3b. The U-shaped profiles of the transverse struts 10c, 10d enable, on the one hand, a secure fixing of the mats 3a, 3b in the air cooler housing 10 and, on the other hand, an easy removal of the mats 3a, 3b from the air cooler housing 10.

As can be inferred from FIGS. 4a, 4b and 4c, the distributor devices 4a, 4b are housed in the transverse struts 10c, 10d. As a result, each distributor device 4a, 4b is arranged above the mat 3a, 3b assigned thereto. For this purpose, the transverse struts 10c, 10d are each formed as a box-shaped housing with a base and a cover running at a distance and parallel to the base and two side walls standing perpendicular to the base between which in each case a distributor device 4a, 4b is arranged. The base of the upper transverse strut 10d and the middle transverse strut 10c has passages 13 here through which liquid can pass which escapes from the lines of the respective distributor device 4a, 4b (FIGS. 4a and 4b). The passages 13 can be formed for example in the form of a perforation in the base. The liquid, which flows from the distributor devices 4a, 4b, can flow through these passages 13, through the transverse struts 10c, 10d and onto the upper side of the mat 3a, 3b arranged therebelow. In the case of the middle transverse strut 10c, corresponding passages 13 are also provided in the cover such that excess liquid, which is flowed through the upper mat 3b, can firstly flow through these passages 13 into the middle transverse strut 10c and from there in turn through the passages 13 in its base onto the upper side of the lower mat 3a (FIG. 4c).

In order to supply the plurality of lines of a distributor device 4a, 4b uniformly with the liquid, each distributor device 4a, 4b has a manifold 12 to which the lines of the distributor device 4a, 4b are connected (FIGS. 4a, 4b and 4c). A supply line of the manifold 12 is in turn connected to the feed line 5.

FIG. 5 shows the supply of the mats 3a, 3b with liquid by means of the respectively assigned distributor devices 4a, 4b. In the case of the embodiment schematically shown in FIG. 5, two identically constructed air coolers 2 are arranged opposite one another in the heat exchanger device, with the heat exchangers 1 assigned to the respective air coolers 2 not being represented here for reasons of clarity. Each air cooler 2 contains an air cooler housing 10 with respectively two mats 3a, 3b arranged therein vertically one above the other, with each mat 3a, 3b comprising a plurality of mat sections 3a', 3a", 3a'" or 3b', 3b", 3b'" arranged edge-to-edge in relation to one another in the longitudinal direction L. To illustrate that the mat sections here can be removed individually from the air cooler housing 10, the two left mat sections 3a' or 3b' of the right air cooler 2 are shown removed.

Each mat 3a, 3b is assigned a distributor device 4a, 4b which is arranged running above the respective mat 3a, 3b in a transverse strut 10c, 10d of the air cooler housing 10. Each distributor device 4a, 4b is connected to a feed line 5 which is connected to a reservoir of a liquid via a pump 15. The pump 15 pumps the liquid via the feed line 5 into the distributor devices 4a, 4b which uniformly distribute the liquid onto the upper side of the mat 3a, 3b assigned thereto. Excess liquid, which runs through the mats 3a, 3b, without being absorbed by the material of the mats, is collected in the pan-shaped base part 10a of the air cooler housing 10 and is pumped back into the feed line 5 by the pump 15 via a collection line 14. The liquid collected in the base part 10a can also be delivered into a waste water channel via a drain line. In order to enable draining of the feed line 5, for example for winter operation, in which the air coolers are not used, drain valves 16 are provided via which the liquid can be drained.

The liquid fed by means of the upper distributor device 4b of the upper mat 3a flows uniformly distributed over the cross-section of the mat 3a forced by gravity downwards and in doing so wets the material of the upper mat 3a. The upper mat 3a is expediently easily oversaturated here with liquid, i.e. rather more liquid is delivered onto the upper distributor device 4b than would be required for complete wetting of the upper mat 3a. The excess liquid not absorbed by the material of the mat 3a flows out from the underside of the upper mat 3a and through the passages 13 in the middle transverse strut 10c onto the upper side of the lower mat 3b and as a result contributes to the wetting of the lower mat 3b.

The distributor devices 4a, 4b can be selectively actuatable in this case. As a result, the air cooler 2 can for example be operated in partial load so as to save liquid by only the lower distributor device 4a being supplied with liquid such that only the lower mat 3a is moistened. By selectively actuating the distributor devices 4a, 4b, sediment formation in the base region of the lower mat 3a and contamination of excess liquid, which is collected in the base part 10a of the air cooler housing 10, can also be prevented.

Selective actuation of the distributor devices 4a, 4b is also advantageous in combination with a selective operation of the heat exchanger sections 1a, 1b because during operation of the apparatus in a partial load where only one of the two heat exchanger sections 1a or 1b is operated for heat exchange, only the assigned region of the air cooler 2 has to be operated with the assigned mat 3a or 3b. In FIG. 6, an embodiment is represented in which each mat 3a, 3b is composed of in total four mat sections 3a', 3a", 3a'", 3a"" or 3b', 3b", 3b'", 3b"" with two sections arranged next to one another in the longitudinal direction L and two sections arranged vertically one above the other. The mat sections 3a', 3a" or 3b', 3b" located next to one another are in this case arranged edge-to-edge in relation to one another on their vertically standing side edges and separated by a vertical strut 10e. The mat sections 3a', 3a'" or 3b', 3b'" located next to one another are in this case also arranged edge-to-edge in relation to one another on their horizontally running edges and separated by a horizontal strut 10f. However, it is also possible that the mat sections 3a', 3a", 3a'", 3a"" or 3b', 3b", 3b'", 3b"" rest edge-to-edge on one another on their horizontal and/or on their vertical side edges without intermediate space.

The division of the humidification means 3 of the adiabatic air cooler into at least two mats 3a, 3b arranged one above the other enables the construction of high-performance heat exchanger devices in the performance range of approx. 2 MW or more with a total height of the apparatus of 4 m or more. By dividing the humidification means 3 into two or more mats 3a, 3b arranged one above the other and by (optionally) also dividing the individual mats 3a, 3b into a plurality of mat sections, which are arranged next to or one above the other edge-to-edge in relation to one another, the manageability of the mats, for example when changing the mats 3a, 3b for cleaning purposes, thereby remains ensured and a uniform wetting of the humidification means is ensured by supplying each mat 3a, 3b with liquid via its own assigned distributor device 4a, 4b for each mat 3a, 3b. In certain embodiments, for easy handling of the mats 3a, 3b, each individual mat 3a, 3b or each of the mat sections can be no higher than 2.5 m or can be less than 2 m high.

The invention is not limited to the embodiments represented in the drawings here. The arrangement of the heat exchangers 1 and the assigned air coolers 2 can thus have other geometries. It is in particular possible to arrange the heat exchangers 1 and/or the air coolers 2 obliquely to the vertical. The number of heat exchangers 1 and the heat exchanger sections 1a, 1b and the number of air coolers 2 and mats 3a, 3b assigned to them can also be adapted to the required performance of the apparatus, just like the number of fans 11. This also applies to the number of mat sections of which the mats 3a, 3b are composed and which can be arranged located next to or one above the other edge-to-edge in relation to one another. Moreover, the distributor devices 4a, 4b can be configured differently to how they are described here. Thus, sprinkler or spraying systems or distributor devices can for example be used with different distributor bodies, such as e.g. distributor plates or the like in order to wet the mats 3a, 3b with the liquid.

Abstract: A heat exchanger device with at least one heat exchanger which is flowed through by a fluid, at least one fan and at least one adiabatic air cooler for cooling air which is drawn in from the surroundings by the fan, wherein the air that has been drawn in is conducted firstly through the air cooler and subsequently through the heat exchanger and the adiabatic air cooler has at least one humidification means, which is arranged in the air cooler and which is composed of a moisture-absorbing material and a liquid feed, which feeds a liquid to the humidification means in order to keep the humidification means moist. In order that the most uniform possible wetting of the humidification means and higher heat exchange performance can be made possible without an impairment of the stability and the handleability of the humidification means and without oversaturation of the humidification means in the upper region with the liquid, provision is made whereby the humidification means comprises at least two mats arranged one above the other and whereby the liquid feed has a distributor device which is arranged above each mat and which serves for uniformly distributing the liquid onto the mats, wherein each distributor device is connected to a feed line via which the distributor devices can be charged with the liquid.

The invention claimed is:

1. A heat exchanger device comprising:
a heat exchanger housing;
a first heat exchanger and a second heat exchanger, wherein each of the first heat exchanger and the second heat exchanger is flowed through by a fluid, wherein the first heat exchanger and the second heat exchanger are arranged on opposite sides of a longitudinal center plane of the heat exchanger housing and are spaced apart from one another and substantially in a vertical direction or inclined to the vertical direction;
at least one fan, arranged on an upper side of the heat exchanger housing, wherein the at least one fan is arranged between the first heat exchanger and a second heat exchanger;
at least a first adiabatic air cooler assigned to the first heat exchanger and a second adiabatic air cooler assigned to the second heat exchanger, wherein each of the first adiabatic air cooler and the second adiabatic air cooler is operable to cool air drawn in from a surrounding by the at least one fan, and wherein the air that is drawn in into the first adiabatic air cooler is firstly conducted through the at least one adiabatic air cooler and subsequently through the first heat exchanger, the air that is drawn into the second adiabatic air cooler is firstly conducted through the second adiabatic air cooler and subsequently through the second heat exchanger, and subsequently the air is blown out from the heat exchanger housing by the fan; and
a first humidification component arranged in the first adiabatic air cooler and a second humidification component arranged in the second adiabatic air cooler, wherein each of the first humidification component and the second humidification component is composed of a moisture-absorbing material; and a liquid feed, which feeds a liquid to the first humidification component and the second humidification component, in order to moisten the moisture-absorbing material of the first humidification component and the second humidification component with the liquid;
wherein each of the first humidification component and the second humidification component includes at least a first mat and a second mat arranged above the first mat;
wherein the liquid feed includes:
a first distributor device arranged above the first mat of the first humidification component to uniformly distribute the liquid onto the first mat of the first humidification component,
a second distributor device arranged above each of the first distributor device and the second mat of the first humidification component, to uniformly distribute the liquid onto the second mat of the first humidification component,
a third distributor device arranged above the first mat of the second humidification component to uniformly distribute the liquid onto the first mat of the second humidification component,
a fourth distributor device arranged above each of the third distributor device and the second mat of the second humidification component, to uniformly distribute the liquid onto the second mat of the second humidification component, and
a feed line connected directly to the first distributor device, the second distributor device, the third distributor device and the fourth distributor device, for charging the first distributor device, the second distributor device, the third distributor device and the fourth distributor device with the liquid.

2. The heat exchanger device according to claim 1, wherein the first and second mats of each the first humidification component and the second humidification component are arranged to extend along one plane and align with one another running in said plane.

3. The heat exchanger device of claim 1, wherein the first distributor device comprises a first distributor body which distributes the liquid uniformly on an upper side of the first mat of the first humidification component, the second distributor device comprises a second distributor body which distributes the liquid uniformly on an upper side of the second mat of the first humidification component, the third distributor device comprises a third distributor body which distributes the liquid uniformly on an upper side of the first mat of the second humidification component, and the fourth distributor device comprises a fourth distributor body which distributes the liquid uniformly on an upper side of the second mat of the second humidification component, and wherein each of the first, second, third, and fourth distributor devices are formed as liquid-permeable pipe or hose lines carrying liquid.

4. The heat exchanger device according to claim 1, further comprising an air cooler housing, in which the first mat and the second mat of at least the first humidification component are arranged.

5. The heat exchanger device according to claim 4, wherein the air cooler housing has a base part formed as a collection device and at least two side parts and at least two transverse struts, wherein the transverse struts extend in the longitudinal direction of the heat exchanger device.

6. The heat exchanger device according to claim 5, wherein for at least the first humidification component, the first mat extends between the base part and a first transverse strut and the second mat extends between the first transverse strut and a second transverse strut.

7. The heat exchanger device according to claim 6, wherein for at least the first humidification component, the first distributor device is arranged in the first transverse strut to moisten the first mat, and the second distributor device is arranged in the second transverse strut to moisten the second mat.

8. The heat exchanger device according to claim 7, wherein for at least the first humidification component, the first transverse strut has a base and a cover running at a distance and parallel to the base, wherein the first distributor device is arranged between the base and the cover and passages are arranged both in the base and in the cover, through which liquid can pass.

9. The heat exchanger device according to claim 1, wherein the feed line includes at least one valve to drain standing liquid in the feed line.

10. The heat exchanger device according to claim 5, wherein each transverse strut has at least one receiving region formed in a U shape in a cross-section to receive an underside or an upper side of one of the first or second mat.

11. The heat exchanger device according to claim 5, wherein for at least the first humidification component, at least one transverse strut has at least one passage through which the liquid can reach one of the first or second mat arranged therebelow.

12. The heat exchanger device according to claim 1, characterized in that each of the first, second, third, and fourth distributor device is connected to the feed line via a manifold.

13. The heat exchanger device according to claim 1, wherein the feed line is coupled to a pump, with which the liquid under pressure is conducted via the feed line to the first, second, third, and fourth distributor devices.

14. The heat exchanger device according to claim 1, wherein at least one of the first or second mat of the first humidification component and the second humidification is composed of a plurality of mat sections, the plurality of mat sections being arranged running in a plane in the longitudinal direction of the air cooler edge-to-edge next to one another or perpendicular to the longitudinal direction one above the other.

15. The heat exchanger device according to claim 14, wherein for each of the first humidification component and the second humidification component, the first and second mat, or each of the plurality of mat sections, is removable separately from the air cooler.

16. The heat exchanger device according to claim 1, wherein each of the first heat exchanger and the second heat exchanger is divided into at least two heat exchanger sections, including a first heat exchanger section and a second heat exchanger section arranged vertically of the first heat exchanger section, each of the at least two heat exchanger sections having a pipeline system separate from one another, through which flows the fluid formed as a refrigerant, which is in heat exchange with air conducted through the heat exchanger.

17. The heat exchanger device according to claim 16, wherein for each of the first heat exchanger and the second heat exchanger, each heat exchanger section is assigned to one of the first or second mats, such that the air drawn in from the surroundings by the fan firstly flows through the respective first or second mat and subsequently through the heat exchanger section assigned thereto.

18. The heat exchanger device according to claim 1, wherein each of the first, second, third, and fourth distributor devices are formed as either a perl hose made of a porous material or a pipeline with a plurality of openings or nozzles.

19. The heat exchanger device according to claim 4, wherein the first mat and the second mat of each the first humidification component and the second humidification are arranged interchangeably.

* * * * *